US006317970B1

(12) United States Patent
Leistner et al.

(10) Patent No.: US 6,317,970 B1

(45) Date of Patent: Nov. 20, 2001

(54) CLIP CRIMPING TOOL

(75) Inventors: Herbert E. Leistner, Toronto (CA); Carlo Stagnoli, Curnasco di Treviolo (IT)

(73) Assignee: Sigma Tool & Machine, Toronto (CA)

(*) Notice: Subject to any disclaimer, the term of this patent is extended or adjusted under 35 U.S.C. 154(b) by 0 days.

(21) Appl. No.: 09/561,860

(22) Filed: Apr. 28, 2000

(51) Int. Cl.[7] .............................. B23Q 7/10; B23P 11/00

(52) U.S. Cl. .............................. 29/816; 29/243.56

(58) Field of Search .............................. 29/816, 818, 243.57, 29/243.56; 173/9, 169

(56) References Cited

U.S. PATENT DOCUMENTS

| | | | | |
|---|---|---|---|---|
| 2,929,069 | * | 3/1960 | Christin | 29/243.56 |
| 2,968,042 | * | 1/1961 | Yankee | 29/243.56 |
| 2,969,545 | * | 11/1961 | Allen | 29/243.56 |
| 3,068,485 | * | 12/1962 | Lingle et al. | 29/243.56 |
| 3,133,288 | * | 5/1964 | Ohgren | 29/243.56 |
| 3,237,290 | * | 3/1966 | Frank | 29/243.57 |
| 3,526,944 | * | 9/1970 | Cherup | 29/243.57 |
| 3,641,656 | | 2/1972 | Langas et al. | 29/243.57 |
| 3,653,117 | * | 4/1972 | Wolfberg et al. | 29/243.56 |

* cited by examiner

*Primary Examiner*—S. Thomas Hughes
*Assistant Examiner*—Marc Jimenez
(74) *Attorney, Agent, or Firm*—Ohlandt, Greeley, Ruggiero & Perle LLP

(57) ABSTRACT

A clip crimping tool includes a body provided with a hollow air storage area and a drive section provided with piston cylinder and a piston, and having a main valve with a diameter that is larger than the piston cylinder and is arranged with the drive section is in line or at an angle with a contact section in which clips are crimped. The air storage area and the arrangement of the main valve and piston cylinder allow the free flow of compressed air into the piston cylinder to provide a fast and efficient drive action.

19 Claims, 9 Drawing Sheets

CLIP CRIMPING TOOL

FIELD OF THE INVENTION

The invention relates to a clip crimping tool, and more particularly, a pneumatic hand-held clip crimping tool for securing clips on wire articles such as furniture springs and frames.

BACKGROUND OF THE INVENTION

Clip crimping tools are utilized in industries in which it is necessary to have a fast, efficient and effective method of quickly applying and crimping clips on to various objects. In one particular application, clip crimping tools are used to connect two wires in furniture springs, for example, within a mattress or chair assembly. Generally speaking, the clip crimping tool is placed around two wires to be secured and is then operated such that a clip is fed around the wires and is then crimped to secure the wires together.

In the past, clip crimping tools have been available. However, they were large and bulky, using complicated mechanisms to provide the necessary crimping force. In particular, in some pneumatic clip crimping tools, the pneumatic valve system had a large and complex design, involving a main valve that was provided adjacent to the air inlet or that was provided in a separate area from the piston cylinder.

In U.S. Pat. No. 3,641,656, there is described a clip crimping tool that includes a pneumatic system for providing the driving force. In this clip crimping tool, the pneumatic system was arranged such that the pneumatic driving force was directed perpendicularly to the required direction of the crimping force. This was necessary because the pneumatic system was large and complex. A linking mechanism was provided to transfer the pneumatic driving force to the direction of the crimping force.

This arrangement had several disadvantages. For example, the use of a large and complex pneumatic system, including the mechanism for transferring the force, required additional materials and was more costly in terms of construction and maintenance. The larger size of the pneumatic system also resulted in more difficult manipulation of and operation of the clip crimping tool.

Further, since the pneumatic system was disposed perpendicular to the direction of the required force, the efficiency of the force transfer was compromised. The requirement of providing a linking mechanism reduced the efficiency of the force transfer and also added extra weight to the clip crimping tool. This weight factor is particularly important in hand-held units.

This prior design of the pneumatic mechanism also had a disadvantage in that the main valve was provided adjacent to the air intake and was only connected to the piston cylinder through a small access tube. The small size of the air intake, main valve, and access tube impeded the free-flow of air and resulted in a slow action of the piston cylinder and thus a slower action of the clip crimping tool.

Clearly there is a need for an improved clip crimping tool that provides a less restricted flow of air, provides a smooth and direct action, and reduces stress on the operator.

BRIEF SUMMARY OF THE INVENTION

In order to address at least most of the difficulties noted above, there is provided an improved clip crimping tool, including a drive section, a contact section connected to and provided in-line with the drive section, a mechanism for feeding a clip into the contact section, and a mechanism for activating the drive section to crimp the clip in the contact section.

Since the contact section is connected in-line with the drive section, the entire force of the drive section can be applied to crimp the clip and the drive action is very fast and efficient.

In another embodiment of an improved clip crimping tool, the clip crimping tool includes a body, a drive section connected with the body, a contact section connected with the drive section, a compressed air feeding mechanism, a mechanism for feeding a clip into the contact section, and a mechanism for activating the drive section. In particular, the drive section includes a piston cylinder having a predetermined diameter, a main valve disposed in communication with the piston cylinder such that the main valve has a diameter that is larger than the diameter of the piston cylinder, and a piston provided in the piston cylinder such that an end of the piston extends from the piston cylinder, and when the drive section is activated, the main valve allows the compressed air into the piston cylinder to drive the piston to crimp the clip in the contact section.

In this tool, the use of a main valve with a diameter that is larger than the diameter of the piston cylinder allows the compressed air to enter the piston cylinder freely and quickly, providing a very fast and efficient action of the drive section to allow clips to be crimped more quickly.

In yet another embodiment, the clip crimping tool is provided with a hollow air storage area in the body thereof. The provision of an air storage area allows the action of the drive section to be faster since the compressed air can enter into the piston valve very quickly.

In appropriate circumstances, the contact section may be either in line or at an angle with the drive section. The arrangement of the contact section in relation to the drive section can be determined according to the environment in which the tool is used. In a particular case, the angle between contact section and drive section may be adjustable.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

Figure 1:
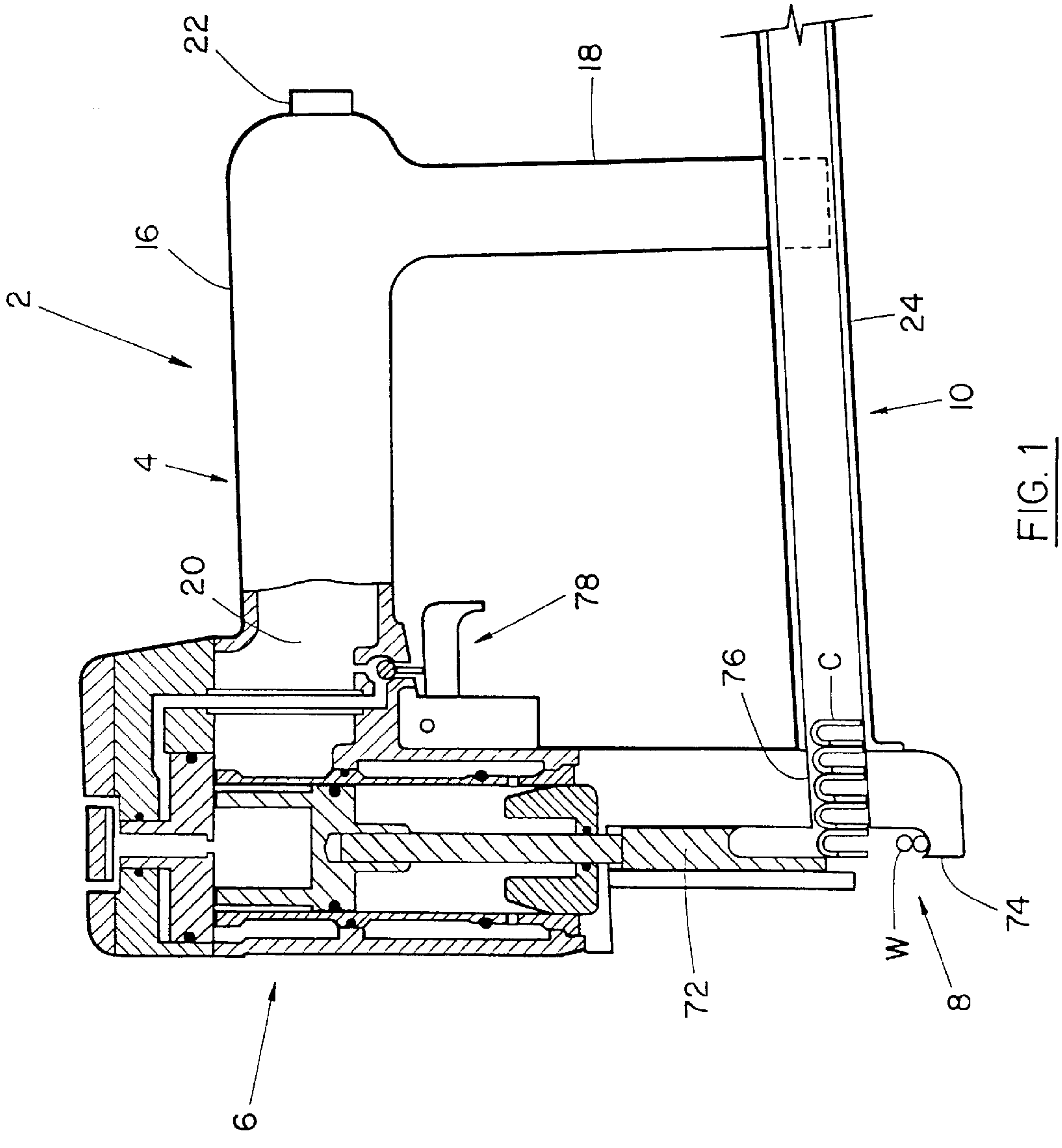
FIG. 1 is a schematic view of an embodiment of a clip crimping tool illustrating the invention when the clip crimping tool is at rest.

As shown in FIG. 1, a clip crimping tool 2 according to an embodiment of the invention includes a handle section 4 that supports a drive section 6. The drive section 6 is disposed above a contact section 8 and the contact section 8 is connected with a clip feeding section 10. In a particular case, the clip feeding section 10 may also be supported by the handle section 4.

Figure 2:
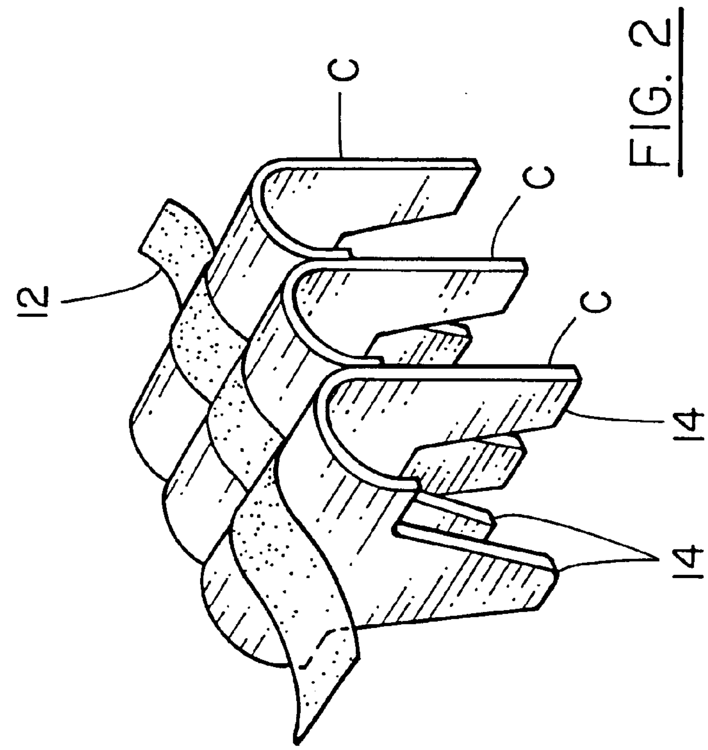
FIG. 2 is a perspective view of clips prior to being crimped by the clip crimping tool of FIG. 1.

FIG. 2 illustrates a string of clips C prior to being crimped. The clips C are held together by a connecting means 12, for example, a tape strip, plastic strip, or metal or plastic wire, as is known in the art, that is connected to each clip C. Each clip C is formed to have tabs 14 that will interlock or interdigitate when the clip C is crimped.

Figure 3:
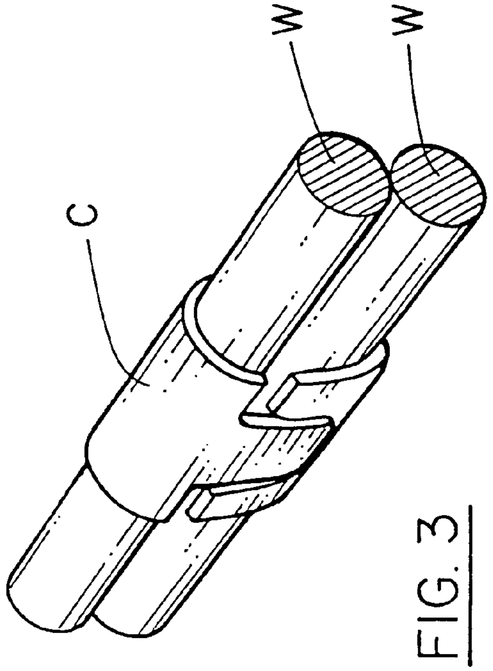
FIG. 3 is a perspective view of two wires secured together by a clip after crimping.

Generally speaking, a user (not shown) will hold the clip crimping tool 2 by the handle section 4. The clips C are fed through the clip feeding section 10 to the contact section 8. The user places wires W (see FIG. 1) or the like to be secured together into the contact section 8 and the user operates the drive section 6. The drive section 6 provides a force to the contact section 8 such that a clip C is separated from the other clips C, pushed around the wires W, and crimped to secure the wires W together. FIG. 3 illustrates two wires W secured together by a crimped clip C.

In this description, the clip crimping tool 2 is described in an orientation such that the drive section 6 is located above the contact section 8 (as shown in FIG. 1), however, it will be understood that the clip crimping tool 2 may be used in other orientations as well. When the clip crimping tool 2 is not being operated, the clip crimping tool 2 is described as being in a rest state.

As shown in FIG. 1, the handle section 4 is L-shaped, one arm of the L-shape defining a handle portion 16 that is shaped to fit in a user's hand and the other arm of the L-shape defining a support portion 18. The handle section 16 is attached to the drive section 6 at the free end of the handle portion 16 and the clip feeding section 10 is supported by the free end of the support portion 18.

The handle portion 16 is hollow, defining an air storage area 20. The air storage area 20 is in communication with an air feed nozzle 22 provided at the joint of the handle portion 16 and the support portion 18. Pressurized air passes through the air feed nozzle 22 into the air storage area 20 and is stored in the air storage area 20 while the clip crimping tool 2 is in a rest state.

The provision of the air storage area 20 within the handle portion 16 provides intermediate storage for pressurized air so that a larger volume of pressurized air can flow freely to drive the drive section 6, as described in more detail below. Pressurized air can also be stored in the support portion 18.

The clip feeding section 10 includes a track 24 formed such that a string of clips C to be crimped are fed along the track 24 to the contact section 8. In this embodiment, the track 24 is supported by the handle section 4. In order to facilitate feeding through the track 24 and provide support of the clips C in the contact section 8, the clips C are connected to each other by the connecting means 12.

Figure 4:
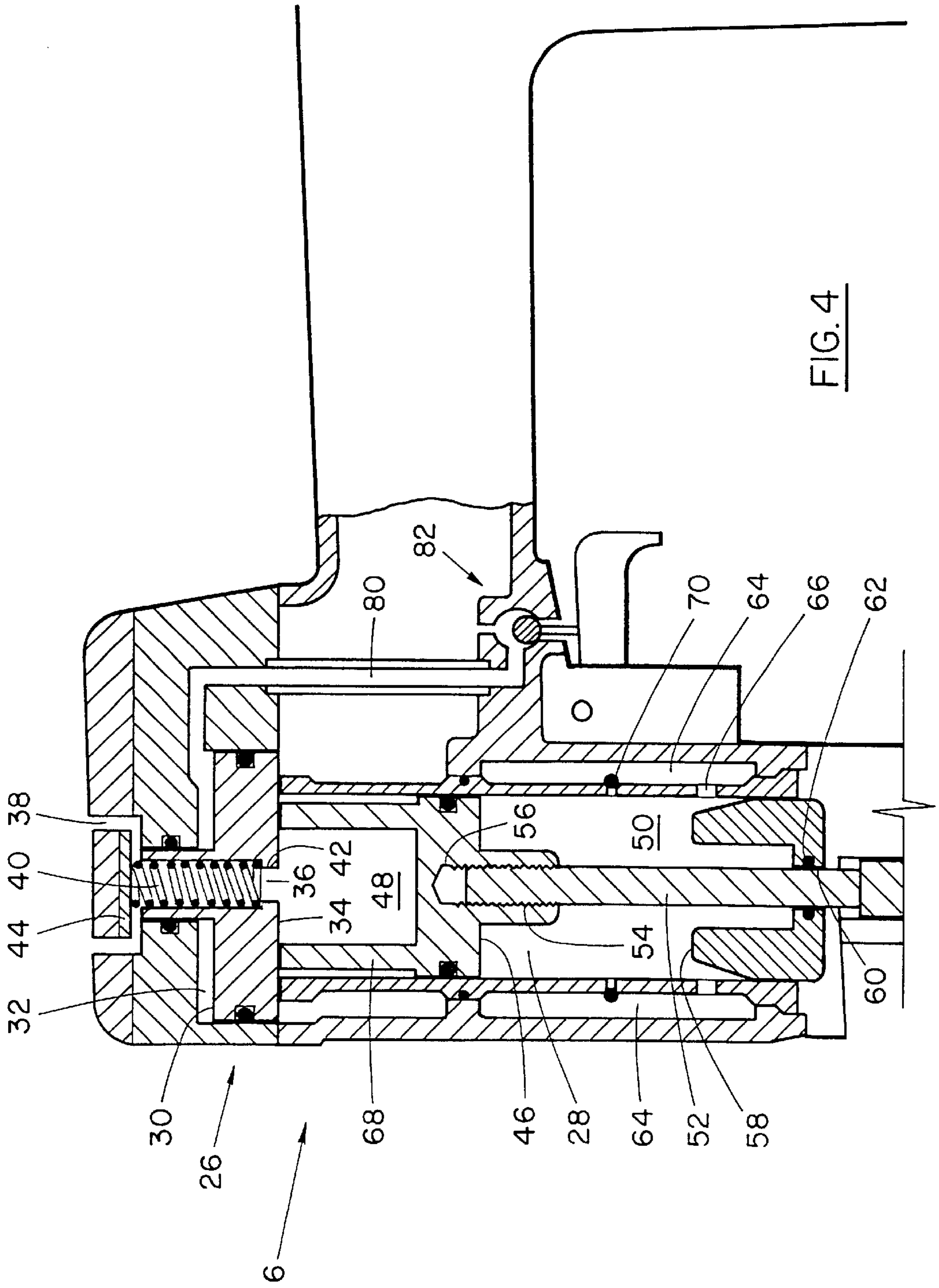
FIG. 4 is a side section view of a drive section of the clip crimping tool of FIG. 1.

As shown in FIG. 4, the drive section 6 includes a main valve 26 that controls the flow of compressed air to and from a piston cylinder 28. The main valve 26 includes a main valve element 30 slidably fitted in a main valve cylinder 32. The main valve cylinder 32 and the main valve element 30 have a diameter which is larger than the diameter of the piston cylinder 28. The main valve 26 is positioned such that the main valve 26 covers an upper opening 34 of the piston cylinder 28. The main valve element 30 is movable between a position in which the main valve element 30 closes the upper opening 34 of the piston cylinder 28 preventing compressed air from entering the piston cylinder 28, referred to as a closed position, and a position in which the main valve element 30 moves away from the upper opening 34 of the piston cylinder 28 allowing compressed air to enter the piston cylinder 28, referred to as an open position.

The main valve element 30 is formed with a central exhaust tube 36, such that, when the main valve 26 is in a closed position, the air in the piston cylinder 28 is in communication with the outside atmosphere through the upper opening 34 of the piston cylinder 28 and through an exhaust port 38 provided on the drive section 6. A spring mechanism 40 is provided in the central exhaust tube 36. The spring mechanism 40 is supported on an annular ridge 42 formed within the central exhaust tube 36 and also supported on an exhaust port end cap 44. The spring mechanism 40 biases the main valve 26 to a closed position.

The movement of the main valve 26 from a closed position to an open position provides two functions, first, allowing compressed air to enter the piston cylinder 28 and, second, closing the exhaust port 38 so that compressed air cannot exit.

Since the opening of the main valve element 30 immediately opens the whole diameter of the upper opening 34 of the piston cylinder 28, a large volume of pressurized air unrestrictedly flows freely from the air storage area 20 into the piston cylinder 28. This allows for a very fast power stroke.

The piston cylinder 28 encloses a piston 46. The piston 46 is slidingly fitted in the piston cylinder 28. The area of the piston cylinder 28 above the piston 46 defines an expansion chamber 48 and the area below the piston cylinder 46 defines an air return chamber 50.

The piston 46 is connected to a smaller diameter piston shaft 52 provided on the centre line of the piston cylinder 28. In this embodiment, the piston shaft 52 is provided with a threaded portion 54 and is screwed into a threaded hole 56 formed in the piston 46, however, other connection means are also possible. The provision of the threaded portion 54 and the threaded hole 56 allows the piston shaft 52 to be easily replaced when worn or broken or to provide an alternate piston shaft (not shown) for other types of clips (not shown).

The piston cylinder 28 is provided at a lower end thereof with a piston buffer 58. The piston buffer 58 may be made of rubber or some other shock absorbing substance. The piston buffer 58 is provided with a shaft opening 60 through which the piston shaft 52 slidably passes. The shaft opening 60 is provided with an air-tight seal 62. The piston buffer 58 is formed to receive the piston 46 at the end of the power stroke and help to absorb the shock of the piston 46 reaching the end of the power stroke.

One or more air reservoirs 64 are provided within the drive section 6 around the piston cylinder 28. In this embodiment, two air reservoirs 64 are provided. As the piston 46 is pushed downward by compressed air entering the expansion chamber 48, the air in the air return chamber 50 is compressed and pushed into the air reservoirs 64 through reservoir holes 66 provided in the piston cylinder 28. The compression of the air entering the air reservoirs 64 also buffers the shock of the piston 46 reaching the end of the power stroke.

The piston 46 is provided with an extended portion 68 that extends into the expansion chamber 48. The extended portion 68 has a smaller diameter than the piston 46, such that, when the piston 46 is at the end of the power stroke, compressed air from the expansion chamber 48 can enter the air reservoirs 64 through replenishment valves 70 provided in the piston cylinder 28. This allows any air lost from the air reservoirs 64 or from the air return chamber 50 to be replenished on each stroke.

When the main valve 26 returns to a closed position (as explained below), the exhaust port 38 opens and the compressed air from the air reservoirs 64 re-enters the air return chamber 50 returning the piston 46 to the rest state.

As shown in FIG. 1, the piston shaft 52 extends out of the drive section 6 and into the contact section 8. In the contact section 8, the piston shaft 52 is provided with a forming element 72. The forming element 72 is formed to match with a forming anvil 74 provided directly below the forming element 72 in the contact section 8. The forming element 72 and the forming anvil 74 are formed such that the tabs 14 of the clip C are interdigitized as the clip C is crimped.

A clip feed opening 76 is provided in the contact section 8 near the lower forming anvil 74. The clip feed opening 76 communicates with the track 24 of the clip feeding section 10 such that the clips C are advanced through the clip feed opening 76 into the path of the forming element 72. As a clip C to be crimped is advanced into the path of the forming element 72, it is held in place by the connecting means 12 connecting it to an adjacent clip C.

Figure 5:
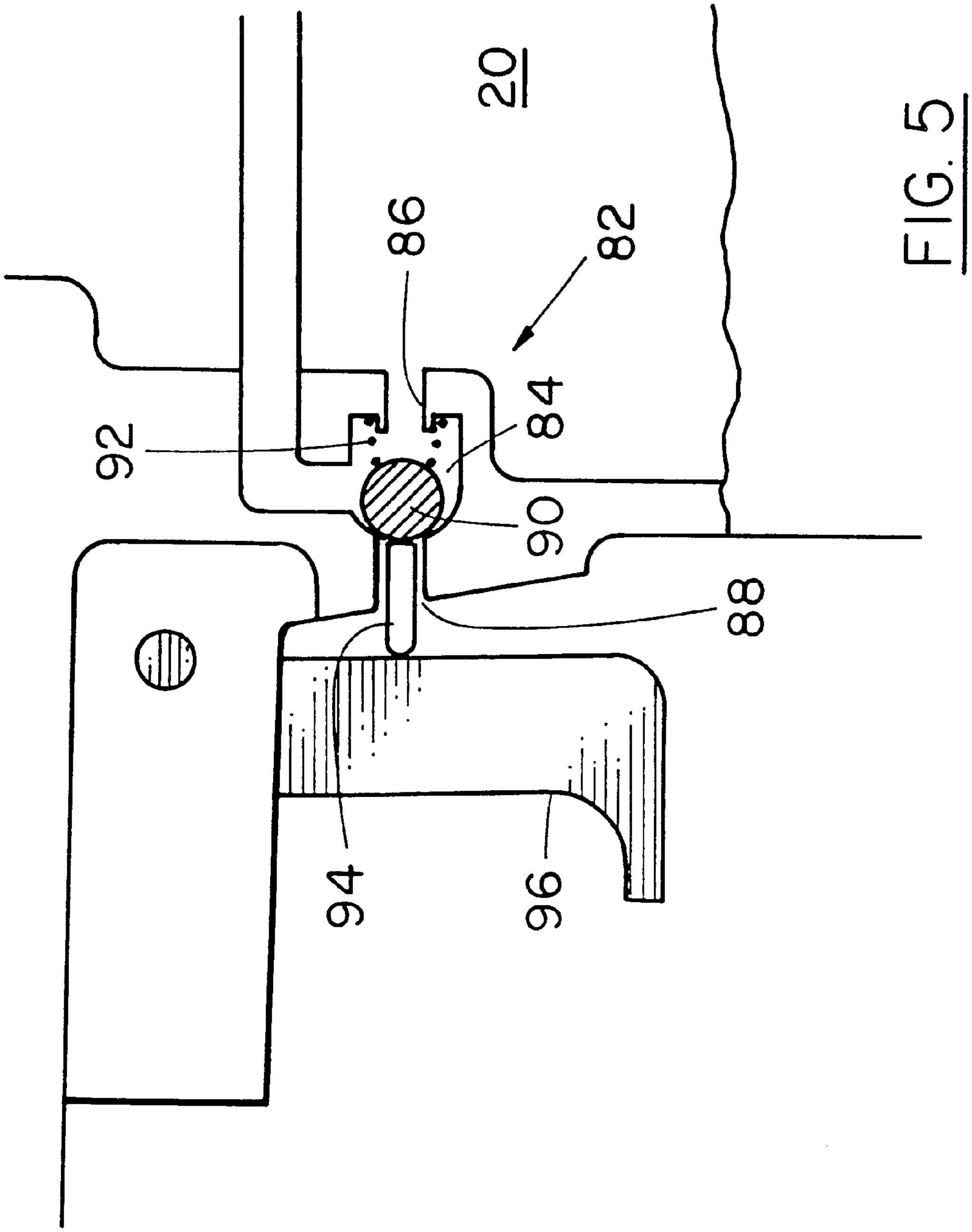
FIG. 5 is a schematic view of a three-way valve of the clip crimping tool of FIG. 1.

The clip crimping tool 2 is activated by a trigger valve mechanism 78 that is provided to the connection between the handle section 4 and the drive section 6 at a position that will be comfortable for a user (not shown). As shown in FIG. 4, the trigger valve mechanism 78 is in communication with the main valve cylinder 32 through a release tube 80 provided between the main valve cylinder 32 and a three-way trigger valve 82 of the trigger valve mechanism 78. Referring to FIG. 5, the three-way trigger valve 82 defines a cavity 84 that is in three-way communication with:

(a) the air storage area 20 of the handle portion 16 through an interior tube 86;

(b) the main valve 26 through the release tube 80; and (c) the outside atmosphere through the trigger release tube 88.

The three-way trigger valve 82 may have many different designs as are known in the art. In this embodiment, the three-way trigger valve 82 includes a ball 90 that is moveably positioned within the cavity 84 and a spring 92 that biases the ball 90 such that the ball 90 is pressed against the trigger release tube 88. The trigger valve mechanism 78 also includes a trigger plunger 94 and a trigger switch 96. The trigger plunger 94 is in contact with the ball 90 of the three-way trigger valve 82 and the trigger plunger 94 is in contact with the trigger switch 96. When the crimping tool 2 is at rest, the ball 90 is biased by the spring 92 to block the trigger release tube 88 while leaving the air storage area 20 of the handle section 4 in communication with the main valve cylinder 32 through the release tube 80. In this state, the main valve 26 is under pressure due to the pressurized air provided to the main valve element 30 through the release tube 80 and remains closed. The clip crimping tool 2 is at rest as shown in FIG. 1.

When the trigger switch 96 is operated, the trigger switch 96 pushes against the trigger plunger 94 which pushes the ball 90 against the force of the spring 92 such that the ball 90 is pressed against the interior tube 86 blocking the path to the air storage area 20. This brings the release tube 80 into communication with the outside atmosphere through the trigger release tube 88. The trigger switch 96 is positioned such that when the trigger switch 96 is operated it does not block the trigger release tube 88.

As the pressurized air vents from the main valve cylinder 32 through the trigger valve mechanism 78, the main valve 26 opens and simultaneously shuts off the exhaust port 38 so that air can no longer vent form the expansion chamber 48 of the piston cylinder 28. The opening of the main valve 26 allows the pressurized air contained in the handle portion 16 to quickly and freely enter the piston cylinder 28 to force the piston 46 downwards to commence the power stroke. Since the diameter of the main valve 26 is larger than that of the piston cylinder 28 and since pressurized air has been stored in in air storage area 20, the flow of pressurized air into the piston cylinder 28 is very fast.

Figure 7:
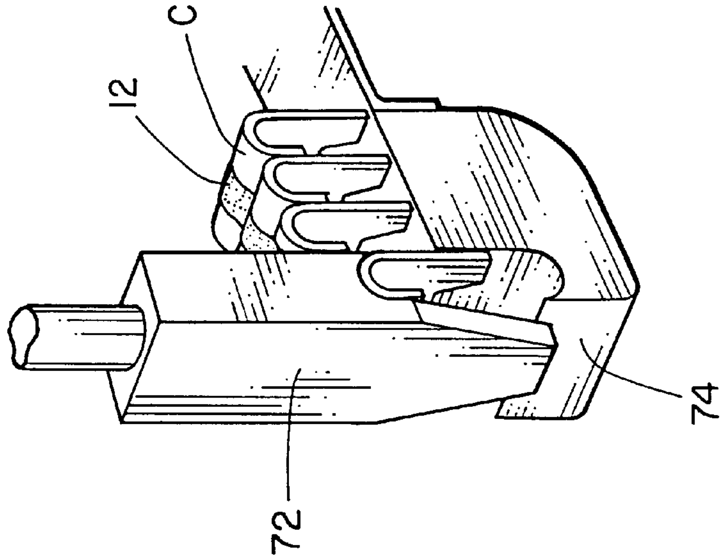
FIG. 7 is a perspective view of the contact section of the clip crimping tool at a similar position to that shown in FIG. 4.
Figure 6:
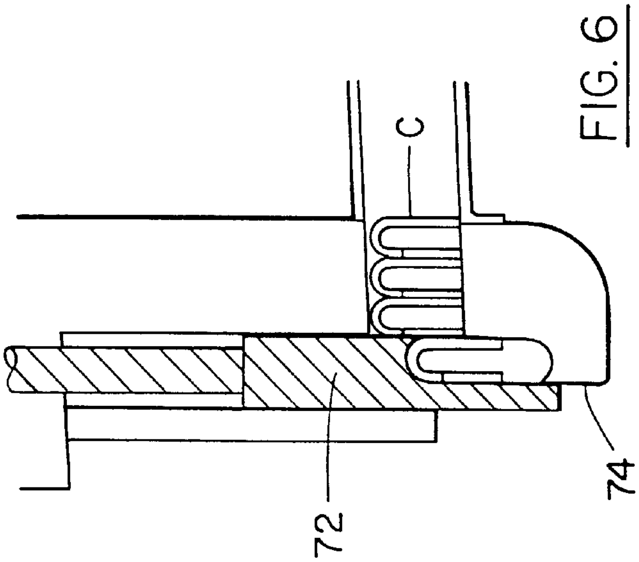
FIG. 6 is a side view of a contact section of the clip crimping tool at the beginning of the power stroke.
Figure 8:
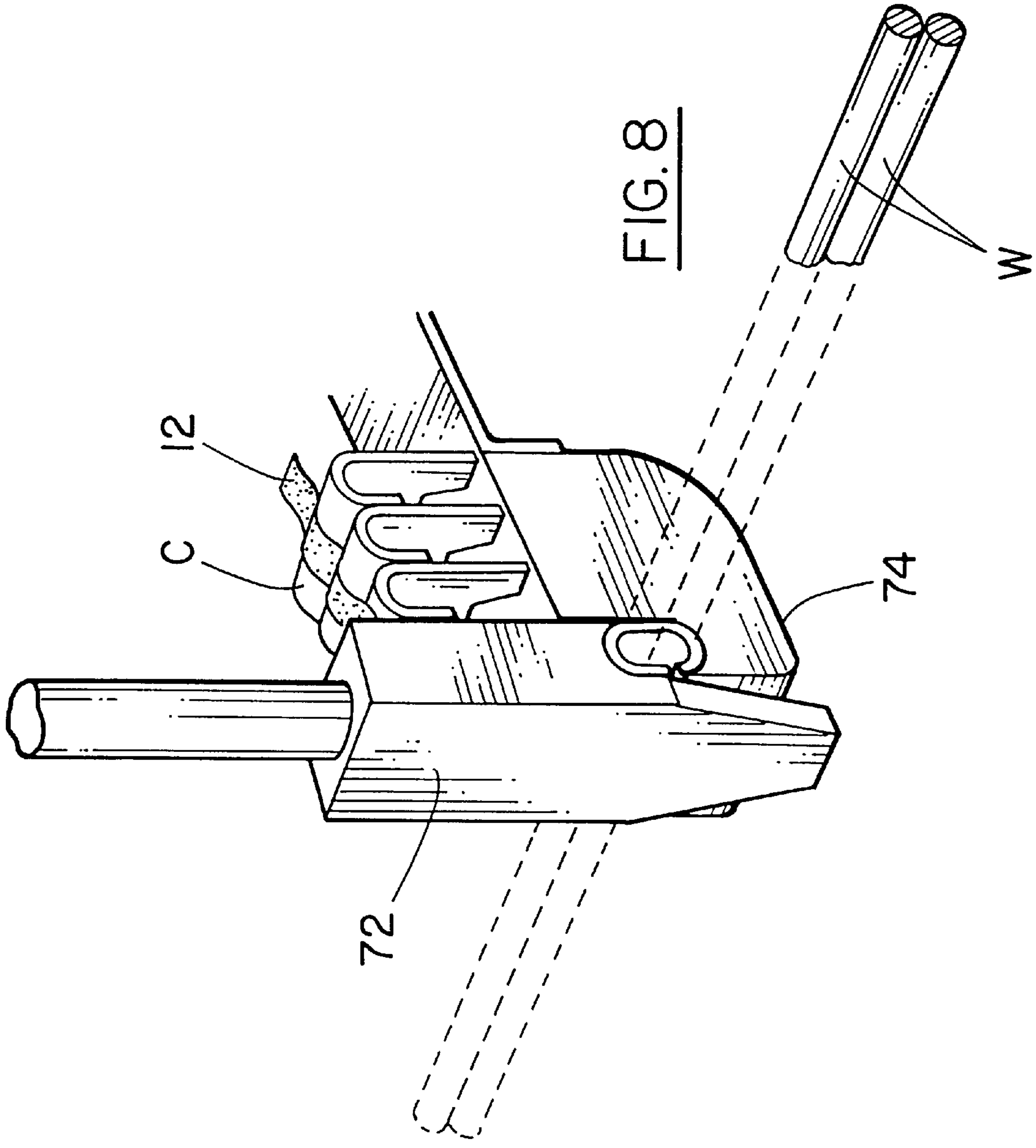
FIG. 8 is a perspective view of the contact section of the clip crimping tool at the end of the power stroke.
Figure 9:
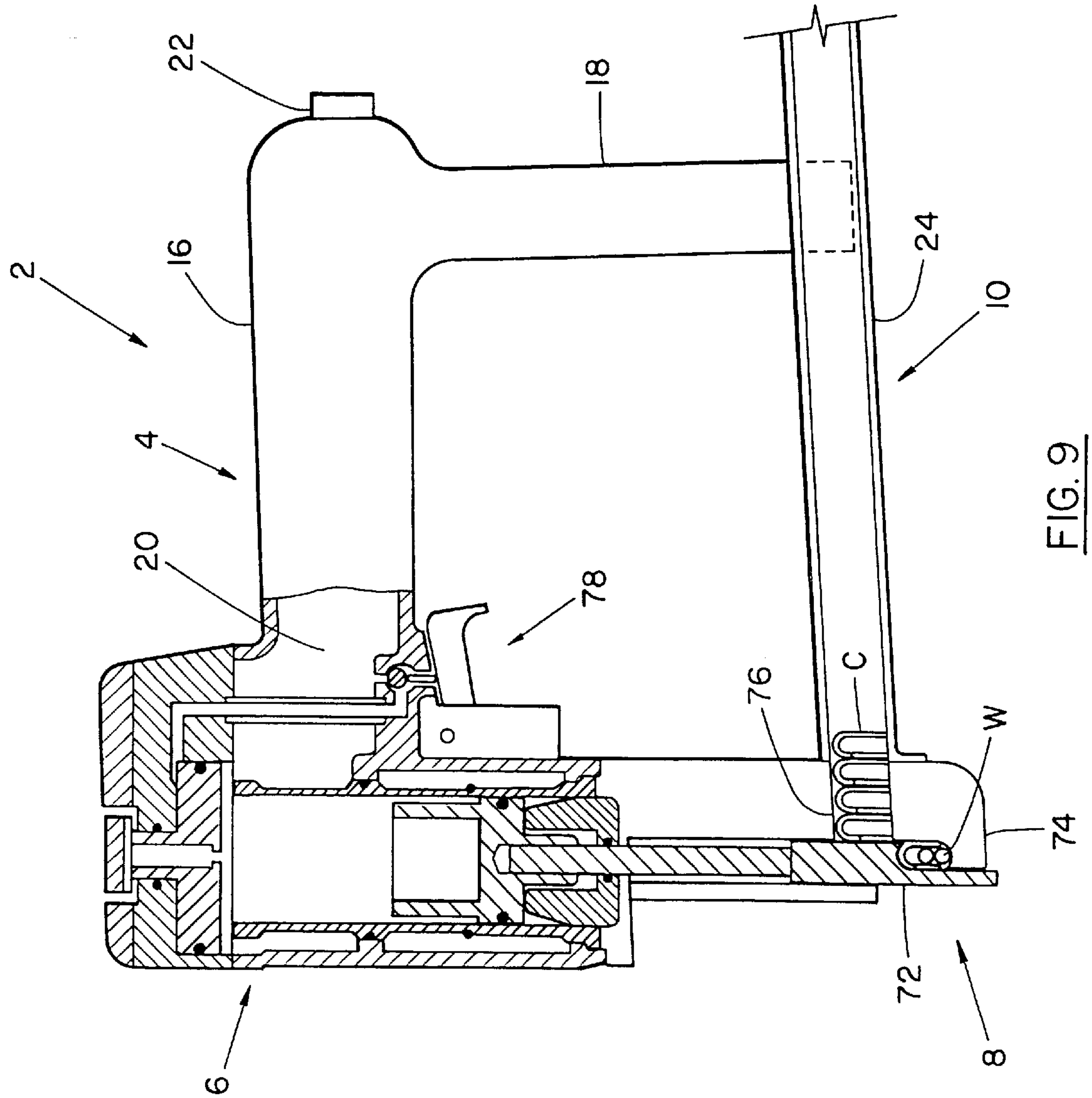
FIG. 9 is a schematic view of the clip crimping tool at the end of the power stroke.
Figure 10:
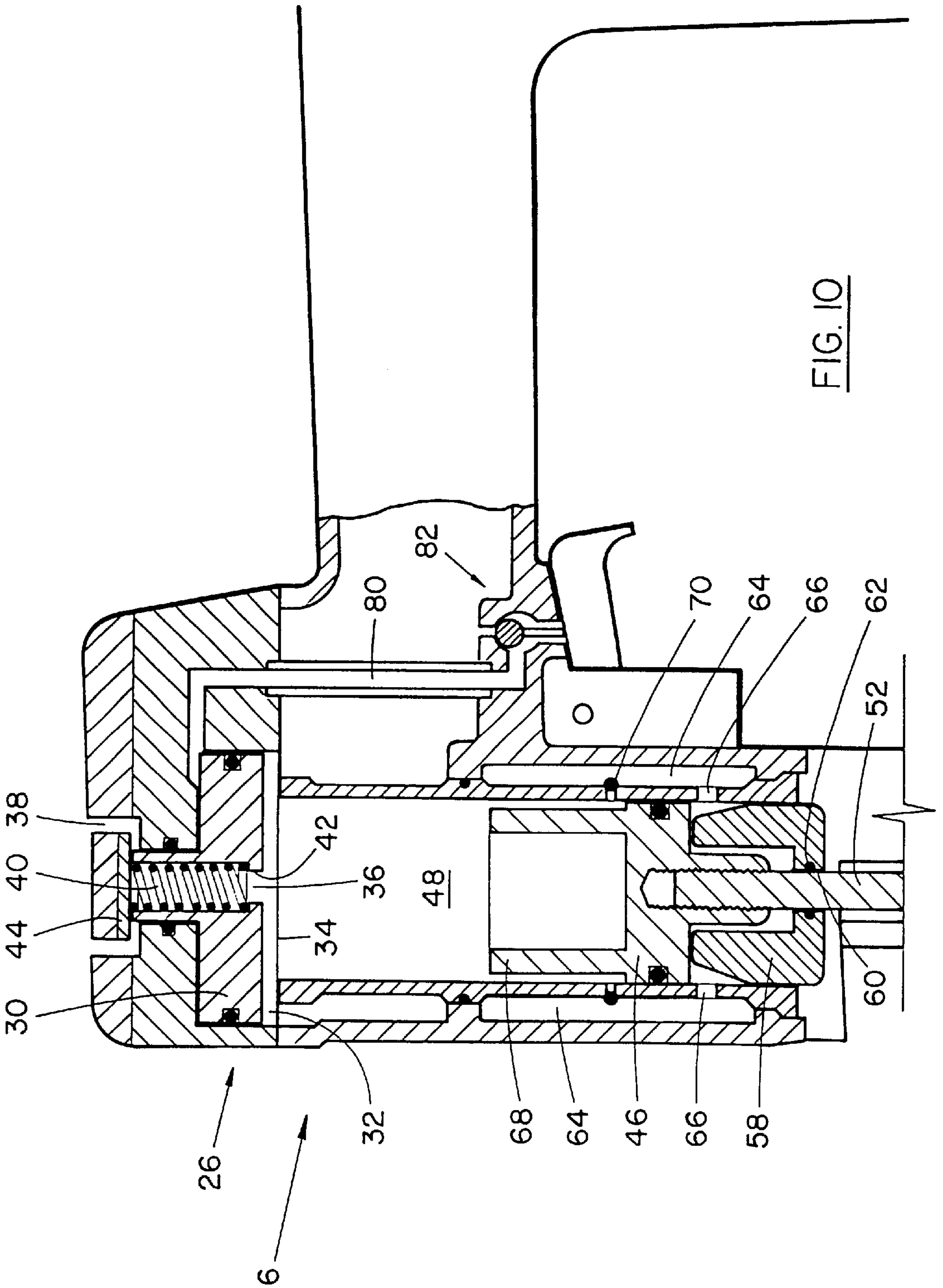
FIG. 10 is a side section view of the drive section of the clip crimping tool of FIG. 9.

As shown in FIGS. 6 and 7, as the forming element 72 is pushed downward by the action of the piston 46, the forming element 72 contacts a clip C and shears the connecting means 12 between the clips C. The forming element 72 continues to move downward, pushing the clip C to enter the forming anvil 74. The clip C contacts with the forming anvil 74 such that the tabs 14 of the clip C are bent around the wires W as shown in FIG. 8. FIGS. 9 and 10 show the clip crimping tool 2 at the end of the power stroke.

The trigger switch 96 is then released and the spring 92 pushes the ball 90 and the trigger plunger 94 to their rest position, sealing the trigger release tube 88. Communication between the release tube 80 and the air storage area 20 is re-established. The main valve element 30 is driven by the return of pressure through the release tube 80 and by the spring mechanism 40 to move from the open to the closed position. In the closed position, the main valve element 30 seals the upper opening 34 of the piston cylinder 28 and allows air to flow out of the expansion chamber 48 through the exhaust tube 36 and out the exhaust port 38. This allows the piston 46 to return to its rest state due to the action of the compressed air contained in the air reservoirs 64.

The clip crimping tool 2 is then removed from the wires W leaving the secured wires W as shown in FIG. 3.

In the embodiment described above, the spring mechanism 40 is used to help drive the main valve 26 from the open position to the closed position, however other arrangements are also possible, for example, if the main valve 26 has a larger surface area exposed to the pressurized air on the top thereof than on the bottom thereof, the main valve element 30 is driven by pressure differential from the open to the closed position.

In the embodiment above, the arrangement of the clip crimping tool 2 to provide the drive section 6 in a vertical orientation over the contact section 8 provides an efficient transfer of force.

Figure 11:
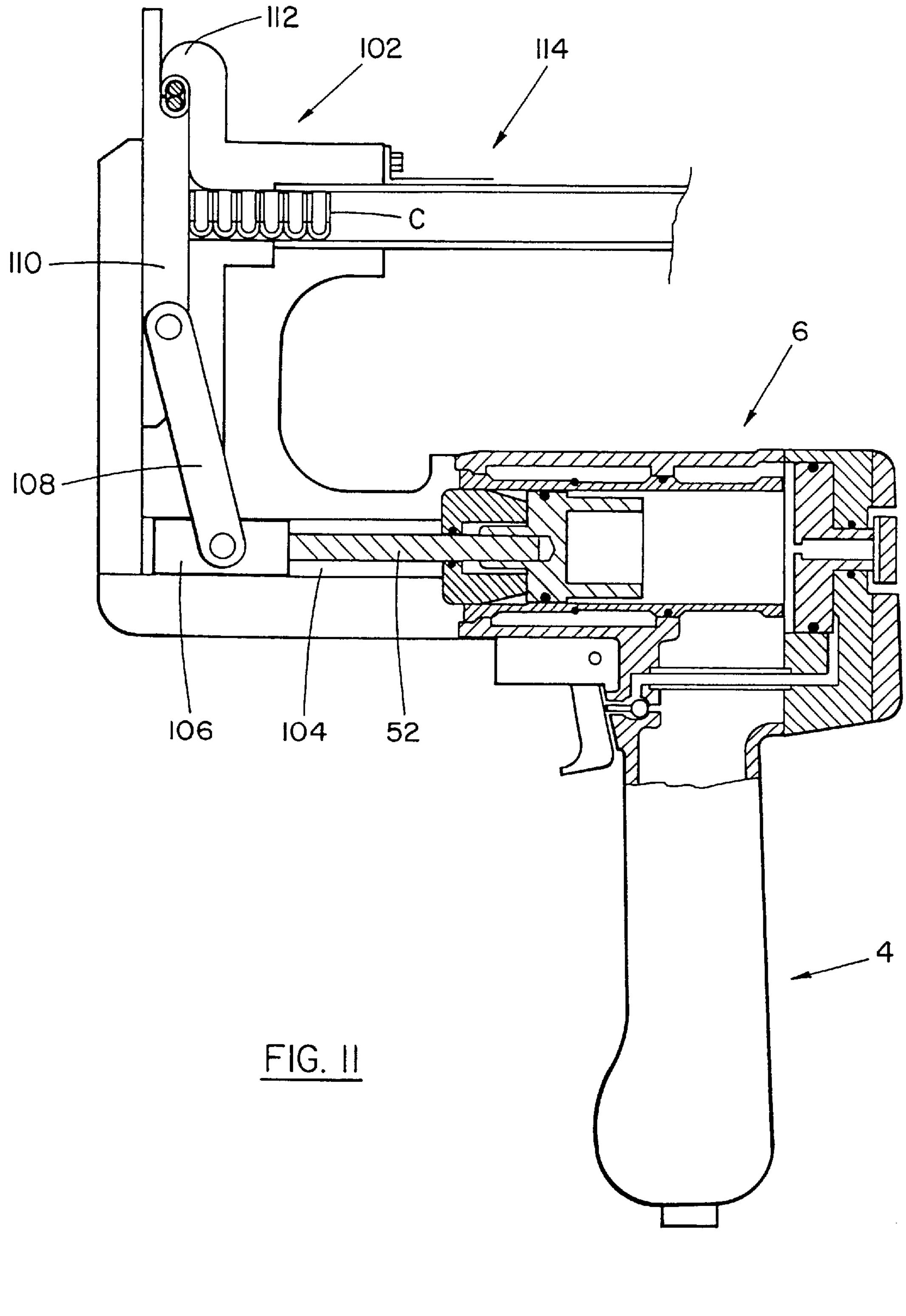
FIG. 11 is a schematic view of another embodiment of a clip crimping tool illustrating the invention.

FIG. 11 shows another embodiment of a clip crimping tool 100 illustrating the invention. In this embodiment, the handle portion 16 and the drive section 6 are the same as those in the embodiment described above and like reference numbers will describe like parts in this embodiment.

As shown in FIG. 11, in this embodiment, the contact section 102 is placed at an angle to the drive section 6. The piston shaft 52 extends out of the drive section 6 into a cylinder 104 and is provided with a piston element 106 at the end thereof. A link member 108 is pivotally attached to the piston element 106 and also pivotally attached to a forming element 110. The forming element 110 is formed to match with a forming anvil 112 provided in the contact section 102. Similar to the embodiment above, the clips C are fed to the contact section 102 by a clip feeding section 114.

It will be apparent to one skilled in the art that the angle between the contact section 102 and the drive section 6 may be determined based on the environment of the clip crimping tool 100, and may in fact be variable depending on the construction of the clip crimping tool 100.

In both of the above embodiments, the provision of a main valve 26 with a diameter that is larger than the diameter of the piston cylinder 28 allows a fast, free flow of compressed air into the piston cylinder 28. This arrangement also allows the main valve 26 to operate with very little movement, allowing a compact design. The provision of the air storage area 20 within the handle section 4 further enables the free flow of compressed air into the piston cylinder 28 to speed the action of the clip crimping tool 100. The clip crimping tool 100 of the invention is compact and provides a fast, efficient action.

The foregoing is a description of preferred embodiments of the invention which are given here by way of example. The invention is not to be taken as limited to any of the specific features as described, but comprehends all such variations thereof as come within the scope of the appended claims.

What is claimed is:

1. A clip crimping tool for crimping a clip, the clip crimping tool comprising:

a drive section being powered by compressed air for supplying crimping force;

a clip contact section being connected to and provided in-line with said drive section;

a feed slide for feeding said clip into said contact section;

a trigger valve being operable to activate said drive section to crimp said clip in said contact section;

a hollow air storage body defining a compressed air storage reservoir and being adapted to be connected in direct communication with a source of compressed air and being connectible to communicate a supply of compressed air collected in said reservoir to said drive section;

a main valve operable in response to operation of said trigger valve to communicate compressed air from said reservoir into said drive section of said clip crimping tool, said drive section including: a piston cylinder in communication with said main valve and having a piston with an end, said end of said piston extending from said piston cylinder; and, a clip element tool provided on said end of said piston, wherein said piston cylinder has a predetermined diameter and defines an open end of equal diameter, and wherein said main valve comprises:

a main valve cylinder;

a main valve element within said main valve cylinder, said main valve element having a diameter that is larger than said diameter of said piston cylinder, and being adapted to seat on said open end of said piston cylinder and being movable therefrom to communicate compressed air from said reservoir to said piston cylinder and wherein said main valve is disposed between said compressed air reservoir and said piston cylinder and including a compressed air connection on said air storage body to supply compressed air to said reservoir.

2. A clip crimping tool as claimed in claim 1, wherein said contact section comprises a forming anvil located in spaced relation to a crimping element, and wherein said feed slide for feeding a clip is provided between said crimping element and said forming anvil.

3. A clip crimping tool as claimed in claim 1, wherein said valve further comprises:

an exhaust conduit extending through said main valve element in communication with said piston cylinder;

an exhaust port in communication with said exhaust conduit when said main valve is closed.

4. A clip tool as claimed in claim 3, wherein said exhaust conduit is disposed on a central axis of said main valve element.

5. A clip crimping tool as claimed in claim 1, wherein said trigger valve for activating said drive section comprises:

an exhaust conduit in communication with said main valve;

a three-way valve in communication with said exhaust conduit; and a trigger switch for controlling the three-way valve such that, in a first state, the three-way valve allows compressed air to enter said main valve keeping it in a closed position and, when the trigger switch is operated, the three-way valve moves to a second state wherein the compressed air is released from said main valve and said main valve is activated thereby permitting compressed air to flow from said reservoir directly into said piston cylinder.

6. A clip crimping tool as claimed in claim 1, wherein said feed slide comprises a track in communication with said contact section, in which said clip is slidably arranged; and an advance mechanism for advancing said clip along said track.

7. A clip crimping tool for crimping clips wherein said clip crimping tool comprises:

a body defining a hollow compressed air storage reservoir;

a drive section connected with said body, said drive section comprising:

a piston cylinder having a predetermined diameter;

a main valve disposed between said reservoir and said piston cylinder, said main valve having a diameter that is larger than said diameter of said piston cylinder, said main valve being operable to supply compressed air to said cylinder; and a piston provided in said piston cylinder, and having an end, said end of said piston extending from said piston cylinder;

a clip contact section being connected with said drive section;

a feed slide for feeding clips into said contact section; and a trigger valve operable for activating said main valve to allow said compressed air to flow from said reservoir into said piston cylinder to drive said piston to crimp one of said clips in said contact section.

8. A clip crimping tool as claimed in claim 7, wherein said end of said piston is provided with a crimping element and said contact section comprises a lower forming anvil located in relation to said crimping element, wherein said feed slide for feeding clips is provided between said crimping element and said forming anvil, and wherein one of said clips is crimped between said crimping element and said lower forming anvil.

9. A clip tool as claimed in claim 7, wherein said contact section is provided in-line with said drive section.

10. A clip crimping tool as claimed in claim 7, wherein said main valve further comprises:

an exhaust conduit extending through said main valve in communication with said piston cylinder;

an exhaust port in communication with said exhaust conduit when said main valve is closed.

11. A clip crimping tool as claimed in claim 10, wherein said exhaust conduit is disposed on a central axis of said main valve element.

12. A clip crimping tool as claimed in claim 7, wherein said trigger valve operable for activating said main valve comprises:

a release conduit in communication with said main valve;

a three-way valve in communication with said release conduit; and a trigger switch that controls the three-way valve such that in a rest state, the three-way valve allows compressed air to create a pressure on said main valve keeping it in a closed position, upon operation of the trigger switch, the three-way valve releases the compressed air from said main valve and said main valve opens, thereby permitting compressed air to flow directly from said reservoir into said piston cylinder.

13. A clip crimping tool as claimed in claim 7, wherein said feed slide for feeding clips comprises:

a track in communication with said contact section, in which said clips are slidably arranged; and an advance mechanism for advancing said clips along said track.

14. A clip crimping tool as claimed in claim 7, wherein said main valve is disposed at an upper part of said drive section; and wherein said piston cylinder defines an open end of equal diameter to said piston cylinder, said main valve normally seating on and closing said cylinder open end;

said end of said piston being provided with a crimping element; wherein said contact section includes:

a forming anvil located in clip forming relation to said crimping element;

wherein said feed slide for feeding clips is provided between said crimping element and said forming anvil, and wherein said main valve is operable to allow said compressed air to flow from said air storage reservoir into said piston cylinder to drive said piston to crimp said clip between said crimping element and said forming anvil.

15. A clip crimping tool as claimed in claim 14, wherein said contact section is provided in-line with said drive section.

16. A clip crimping tool as claimed in claim 7, wherein said main valve further comprises an exhaust conduit extending through said main valve in communication with said piston cylinder, and an exhaust port in communication with said exhaust conduit when said main valve is closed.

17. A clip crimping tool as claimed in claim 16, wherein said exhaust conduit is disposed on a central axis of said main valve element.

18. A clip crimping tool as claimed in claim 7, wherein said trigger valve is operable to activate said drive section and includes an exhaust conduit in communication with said main valve;

a three-way trigger valve in communication with said exhaust conduit; and a trigger switch that controls the three-way valve such that in a rest state, the three-way valve allows compressed air to enter the main valve keeping it in a closed position upon operation of the trigger switch, the three-way valve releases the compressed air from said main valve.

19. A clip crimping tool as claimed in claim 7, wherein said feed slide for feeding clips comprises:

a track, in communication with said contact section, in which said clips are slidably arranged;

an advance mechanism for advancing said clips along said track.

* * * * *